United States Patent [19]

Korski

[11] 4,380,788
[45] Apr. 19, 1983

[54] AERIAL REFUEL FLOODLIGHT

[75] Inventor: Victor E. Korski, Fort Worth, Tex.

[73] Assignee: The United States of America as represented by the Secretary of the Air Force, Washington, D.C.

[21] Appl. No.: 262,656

[22] Filed: May 11, 1981

[51] Int. Cl.³ .................... B64D 39/00; B64D 47/02
[52] U.S. Cl. .................... 362/62; 244/135 A
[58] Field of Search ............... 362/62; 244/135 A

[56] References Cited

U.S. PATENT DOCUMENTS

| | | | |
|---|---|---|---|
| 1,772,889 | 8/1930 | Fairchild | 262/62 |
| 1,946,379 | 2/1934 | Ziesing | 240/7.7 |
| 2,257,127 | 9/1941 | Roper et al. | 240/7.7 |
| 3,285,544 | 11/1966 | Chope et al. | 244/135 |
| 3,917,196 | 11/1975 | Pond et al. | 244/77 R |
| 4,095,761 | 6/1978 | Anderson et al. | 244/135 A |
| 4,158,885 | 6/1979 | Neuberger | 364/460 |
| 4,160,534 | 6/1979 | White | 244/135 A |
| 4,288,845 | 9/1981 | Finsness | 362/62 |

Primary Examiner—Irwin Gluck

Attorney, Agent, or Firm—Donald J. Singer; Jacob N. Erlich

[57] ABSTRACT

An aerial refuel floodlight capable of being mounted on the leading edge of a vertical stabilizer in a receiver aircraft utilized for in flight refueling. The aerial refuel floodlight is of a projectile-shape having a lamp mounted therein. Surrounding the lamp is a cone-shaped reflecting element terminating in a hemispherically-shaped reflecting element which directs light emanating from said lamp through an off-axis lens mounted adjacent thereto. A scoop-shaped reflector situated adjacent the lens and in the upper part of the fixture directs the magnified light onto the fuselage of the receiver aircraft adjacent to and including the refuel receptacle. The location of the aerial refuel floodlight on the vertical stabilizer causes the refueling boom to cast a shadow on the fuselage of the aircraft being refueled to give the boom operator a means for estimating position and distance between the extended boom and the refuel receptacle while simultaneously eliminating substantial amounts of glare from the fuselage of the aircraft.

8 Claims, 3 Drawing Figures

U.S. Patent  Apr. 19, 1983  4,380,788
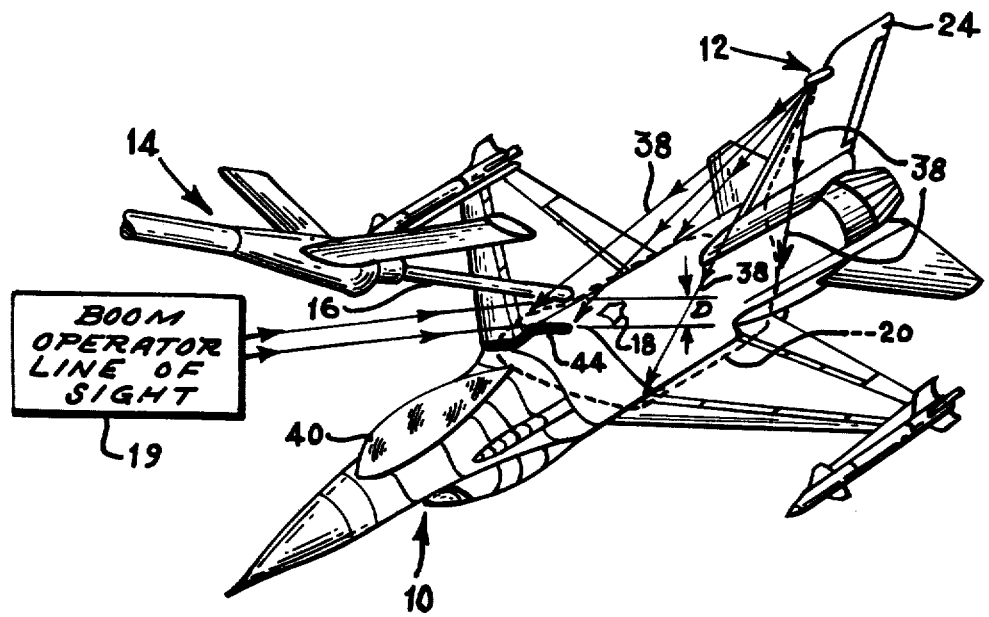
FIG.1
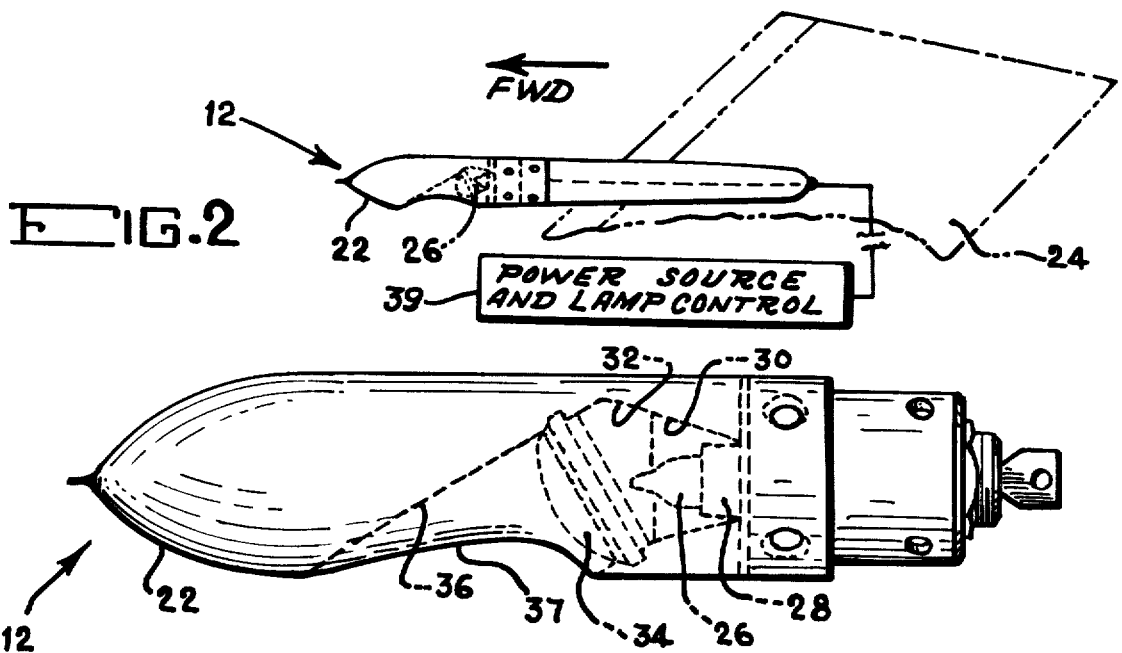
FIG.2
FIG.3

AERIAL REFUEL FLOODLIGHT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to aerial refueling systems between a tanker aircraft and a receiver aircraft, and, more particularly, to an aerial refueling floodlight which is formed as part of the receiver aircraft's vertical stabilizer and thereby provides controlled illumination in order to improve the visibility of the aerial refuel receptacle on the receiver aircraft to insure safe and efficient night refueling operation under substantially all flight conditions.

It is a well established procedure to refuel aircraft in flight. This refueling procedure takes place between a tanker aircraft and a receiver aircraft and can be performed under varying conditions and time. Generally, aerial refueling involves the use of a fuel line in the form of a boom extending downwardly and rearwardly from the tanker aircraft, means positioned on the boom which is controllable from within the tanker aircraft for maneuvering the boom into a position appropriate for coupling with the receiver aircraft, and a coupler at the end of the refueling boom for interconnection with a refuel receptacle on the receiver aircraft.

The receiver aircraft, prior to establishing a suitable position for receiving fuel from the tanker, must first locate the tanker by such means as radar or homing devices which are known in the art. Once the tanker is located, the receiver aircraft then must assume and maintain a position immediately behind and below the tanker within the so called "refueling envelope". The "refueling envelope" is defined as that volume of space behind the tanker, the allowable limits within which the refueling boom may be maneuvered horizontally and vertically and extended or retracted without imposing undesirable stress on the refueling boom.

The receiver aircraft ordinarily must rely on visual contact with the tanker from a point several hundred yards (depending on lighting and weather conditions) from the tanker to the proper position within the "refueling envelope". Of particular importance and difficulty are the delicate maneuvers and the attendant careful coordination between the boom operator and receiver aircraft pilot required at the precise point of hookup in maintaining the appropriate relative position of tanker and receiver aircraft during refueling. This operation, although requiring a high degree of skill by the boom operator and receiver aircraft pilot, is relatively routine during daylight and suitable weather conditions. With existing methods, however, aerial refueling operations performed at night or under other limited visibility conditions are extremely difficult and hazardous.

Heretofore, the illumination of a receiver aircraft refueling receptacle was designed without consideration of the refueling boom operator's methods, operations and limitations of aerial refueling at night. The refueling receptacle and area surrounding the refueling receptacle are generally flooded with excess illumination, assuming the brightest light would provide the necessary illumination to refuel the aircraft safely and efficiently during night time conditions. Unfortunately, such excess light confuses the boom operator by making it difficult to distinguish the location of the boom because of the magnitude of the glare reflected from the polished surface of the extended boom caused by the excessive illumination. Furthermore, the receptacle and surrounding receiver aircraft fusalage also provided an additional source of glare instead of controlled illumination.

Consequently, it would be extremely desirable to provide some type of aerial refuel illumination system which is capable of aiding both the boom operator as well as the receiver aircraft pilot in accomplishing night time or limited visibility aerial refueling.

SUMMARY OF THE INVENTION

The aerial refuel floodlight of this invention overcomes the problems encountered in the past and as set forth hereinabove. By incorporating the uniquely designed floodlight within the vertical stabilizer of a receiver aircraft it can easily be utilized to illuminate the aerial refuel receptacle and surrounding area of the receiver aircraft in order to aid in aerial refueling during night time and limited visibility conditions.

The aerial refuel floodlight of the present invention is made in a bullet or projectile-shaped configuration and is attached by means of a fixture to the vertical stabilizer of the receiver aircraft. The fixture contains therein a bulb or lamp preferably of the tungsten halogen type. Surrounding the lamp is a cone-shaped reflector which terminates in a hemispherically-shaped reflector. Adjacent the hemispherically-shaped reflector is an off axis lens. Light emanating from the lamp is directed by means of the cone-shaped reflector to the hemispherically-shaped reflector and from there through the lens. The lens focuses the resulting light to an inverted scoop reflector. This inverted scoop reflector makes it possible to profile the illumination reaching the top of the fuselage of the receiver aircraft. In addition, the lens concentrates the greatest light energy directly on the refuel receptacle of the receiver aircraft.

Combining the location of the aerial refuel floodlight on the vertical stabilizer with its unique design, enables the aerial refuel floodlight of this invention to eliminate direct nuisance radiation from the lamp to the boom operator's station in the tanker aircraft when the boom is fully compressed. The low intensity light which enters the cockpit is over the shoulder of the pilot of the receiver aircraft and therefore does not present a nuisance to him.

When the compressed or extended boom intercepts the light radiation pattern the boom casts a shadow on the top of the fuselage of the receiver aircraft. The boom operator can perceive and/or estimate how close the boom is to the receiver aircraft by judging the juxtaposition of the end of the boom and the end of the shadow on the fuselage. This distance is variable depending upon the angle created by the end of the boom intercepting the beam of light and the alignment of the flight of the two aircraft. In any case, the shadow will close the distance faster than the boom. In addition, since the radiation pattern emanating from the aerial refuel floodlight of this invention is limited to the top of the fuselage, the aerial refuel floodlight in a dim mode, can be utilized as a formation light.

It is therefore an object of this invention to provide an improved aerial refuel floodlight.

It is another object of this invention to provide an aerial refuel floodlight which may be incorporated within the vertical stabilizer of a receiver aircraft and, therefore, substantially improve the aerial refueling operation under night time or other limited visibility conditions.

It is still another object of this invention to provide an aerial refuel floodlight which can also be utilized in its dim mode of operation as a formation light.

It is still a further object of this invention to provide an aerial refuel floodlight which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a pictorial representation of a receiver aircraft having the aerial refuel floodlight of this invention installed therein and utilized in conjunction with a refueling boom during an in flight refueling operation;

FIG. 2 is a side elevational view of the aerial refuel floodlight of this invention shown attached to the vertical stabilizer of a receiver aircraft; and FIG. 3 is an enlarged side elevational view of a portion of the aerial refuel floodlight of this invention showing in detail the elements thereof.

DETAILED DESCRIPTION OF THE PREFERRED EMBODIMENT

Reference is now made to FIG. 1 of the drawing which pictorially illustrates a receiver aircraft 10 having incorporated therein the aerial refuel floodlight 12 of this invention. Receiver aircraft 10 is positioned so as to receive from a tanker aircraft (not shown) the aerial refuel boom 14 which is operably connected thereto. Boom 14 generally extends rearwardly from the tanker aircraft and has an extendable probe section 16 formed as part thereof. A boom operator stationed within the tanker aircraft is capable of remotely controlling boom 14 so as to engage the extendable probe section 16 with a suitable refuel receptacle 18 located on receiver aircraft 10. The boom operator is positioned within the tanker aircraft such that he might simultaneously view (as indicated by his line of sight 19) both boom 14 of the tanker aircraft and the refuel receptacle 18 of receiver aircraft 10.

In order for the refueling operation to take place at night or in dimly lit conditions, it is necessary for the aerial refuel floodlight 12 of this invention to illuminate an area indicated by dotted lines 20 in FIG. 1 juxtaposed as well as including the refuel receptacle 18. This illumination must be such that it does not serve as a source of glare but is instead of controlled illumination.

The aerial refuel floodlight 12, more clearly illustrated in FIG. 2 of the drawing, by its unique configuration and structural makeup is capable of providing the appropriate illumination for the refueling operation to successfully take place. Refering now specifically to FIGS. 2 and 3 of the drawing, aerial refuel floodlight 12 is illustrated as being made up of a bullet or projectile-shaped housing or fixture 22. Fixture 22 of aerial refuel floodlight 12 is mounted within the leading edge of the top portion of the vertical stabilizer 24 of receiver aircraft 10. The projectile-like configuration of fixture 22 as well as its small size allows the air flow across vertical stabilizer 24 to be substantially unaffected by the aerial refuel floodlight 12 of this invention. The vertical distance between the refuel receptacle 18 and the position of the refuel floodlight 12 on the stabilizer 24 is determined as a function of the design of the reflectors utilized within the refuel floodlight 12 as well as the mean spherical candle power of a bulb or lamp 26 utilized therewith.

Lamp 26, although not limited thereto, is made of any suitable illumination type device, preferably a tungsten halogen lamp of approximately 12 W power. Tungsten halogen lamps are utilized with this invention because of their spectral emission and the improved mean spherical candle power for their size. Lamp 26 is securely mounted within a lamp receptacle 28 and extends in the axial direction therefrom. Surrounding lamp 26 is a cone-shaped reflector 30 which terminates at its upper end in a hemispherically-shaped reflector 32. As a result of the hemispherical configuration of reflector 32, an off axis lens 34 can be positioned adjacent lamp 26. In this manner light emanating from lamp 26 is directed from cone-shaped reflector 30 to hemispherically-shaped reflector 32 and then through the off axis lens 34. Lens 34 focuses the resulting light down an inverted scoop-like reflector 36 situated adjacent thereto and to an opening 37 formed on the bottom of fixture 22 so as to allow controlled illumination of the top of the fuselage of receiver aircraft 10.

It is therefore readily apparent from the drawing that light which passes through lens 34 not only directly illuminates receiving aircraft 10 but also is reflected off the scoop-like reflector 36 and directed substantially straight downward. The actual lighting configuration can be best shown by the direction of the arrows 38 illustrated in FIG. 1 of the drawing which set forth an area of illumination 20 illustrated therein. Control and power 39 for aerial refuel floodlight 12 of this invention is of conventional design and is situated within the receiver aircraft 10 to be controlled by the pilot of the receiver aircraft 10 or remotely by the boom operator in the tanker aircraft.

The combination of the location of floodlight 12 on the vertical stabilizer 24 and the unique structural relationship between the elements contained in fixture 22 of the aerial refuel floodlight 12 of this invention eliminates direct nuisance radiation from lamp 26 to the boom operator's station when boom 14 is fully compressed. The low intensity light entering the cockpit 40 of receiver aircraft 10 is over the shoulders of the pilot and therefore does not represent a nuisance.

The receiver aircraft 10, although illustrated as an F-16 aircraft is only shown as a typical application for the aerial refuel floodlight 12 of this invention. The principle of the aerial refuel floodlight 12 of this invention could be also applied to other aircraft in order to substantially improve the night refueling operation.

In addition, the particular location of the aerial refuel floodlight 12 of this invention is also unique in that fixture 22 is located high on vertical stabilizer 24 so that light emission is directed forward and downward. When the compressed or extended boom 14 intercepts the light radiation pattern 20 from aerial refuel floodlight 12, probe 16 of boom 14 casts a shadow 44 on the top of the fuselage of receiver aircraft 10. The boom operator can perceive and/or estimate how close boom probe 16 is to the receiver aircraft 10 by judging the juxtaposition of the end of probe 16 and the end of shadow 44 on the fuselage of receiver aircraft 10. This distance, D, is a variable depending upon the angle created by the end of probe 16 of boom 14 intercepting the beam of light and the alignment of the two aircraft. In any case, shadow 44 will close the distance D faster than the boom 14. As a result of this invention an inflight refueling operation during night time can be achieved more accurately and with less danger than in the past.

In addition, since the radiation pattern 20 is limited to the top of the fuselage, the aerial refuel floodlight 12 of this invention in a dim mode controlled by the pilot of the receiver aircraft 10 can be used as a formation light. That is, low level light is reflected from the vertical stabilizer 24, horizontal surfaces and wings as well as the fuselage of aircraft 10.

Although this invention has been described with reference to a particular embodiment it will be understood to those skilled in the art that this invention is also capable of a variety of alternate embodiments within the spirit and scope of the appended claims.

I claim:

1. In a receiver aircraft utilized for in flight refueling having a fuselage, a vertically extending stabilizer and a refuel receptacle, the improvement therein being in the form of an aerial refuel floodlight mounted upon the leading edge of the top portion of said vertical stabilizer, said aerial refuel floodlight comprising an elongated fixture having a projectile-like configuration, a lamp, means situated within said fixture for mounting said lamp in position therein, means surrounding said lamp for reflecting light emanating from said lamp in a predetermined direction, a lens situated adjacent said lamp along an axis being at an angle with respect to the axis of said lamp, means situated adjacent said lens for directing light passing through said lens in a predetermined direction, and an opening situated within said fixture juxtaposed said light directing means and said lens for allowing said directed light as well as light passing through said lens to pass therethrough thereby illuminating a portion of said fuselage adjacent and including said refuel receptacle.

2. In an aircraft as defined in claim 1 wherein said floodlight further comprises means operably connected to said lamp for controlling the amount of light emanating from said lamp.

3. In an aircraft as defined in claim 2 wherein said reflecting means comprises a cone-shaped reflector adjacent said lamp terminating at the upper portion thereof in a hemispherically-shaped reflector for directing light from said lamp through said lens.

4. In an aircraft as defined in claim 3 wherein said directing means located adjacent said lens is in the form of an inverted scoop-shaped reflecting element.

5. An aerial refuel floodlight comprising an elongated fixture having a projectile-like configuration, a lamp, means situated within said fixture for mounting said lamp in position therein, means surrounding said lamp for reflecting light emanating from said lamp in a predetermined direction, a lens situated adjacent said lamp along an axis being at an angle with respect to the axis of said lamp, means situated adjacent said lens for directing light passing through said lens in a predetermined direction, and an opening situated within said fixture juxtaposed said light directing means and said lens for allowing said directed light as well as light passing through said lens to pass therethrough.

6. An aerial refuel floodlight as defined in claim 5 further comprising means operably connected to said lamp for controlling the amount of light emanating from said lamp.

7. An aerial refuel floodlight as defined in claim 6 wherein said reflecting means comprises a cone-shaped reflector adjacent said lamp terminating at the upper portion thereof in a hemispherically-shaped reflector for directing light from said lamp through said lens.

8. An aerial refuel floodlight as defined in claim 7 wherein said directing means located adjacent said lens is in the form of an inverted scoop-shaped reflecting element.

* * * * *